(12) United States Patent
Jang

(10) Patent No.: US 10,997,051 B2
(45) Date of Patent: May 4, 2021

(54) SERVER, METHOD OF CONTROLLING SERVER, AND COMPUTER PROGRAM STORED IN COMPUTER READABLE MEDIUM THEREFOR

(71) Applicant: TMAXSOFT CO., LTD., Gyeonggi-do (KR)

(72) Inventor: Woosung Jang, Gyeonggi-do (KR)

(73) Assignee: TMAXSOFT CO., LTD., Gyeonggi-do (KR)

( * ) Notice: Subject to any disclaimer, the term of this patent is extended or adjusted under 35 U.S.C. 154(b) by 215 days.

(21) Appl. No.: 16/020,957

(22) Filed: Jun. 27, 2018

(65) Prior Publication Data

US 2019/0370144 A1 Dec. 5, 2019

(30) Foreign Application Priority Data

Jun. 1, 2018 (KR) .................. 10-2018-0063164

(51) Int. Cl.
| | |
|---|---|
| G06F 3/00 | (2006.01) |
| G06F 11/34 | (2006.01) |
| G06F 11/30 | (2006.01) |
| G06F 11/00 | (2006.01) |
| G06F 9/46 | (2006.01) |
| G06F 9/54 | (2006.01) |

(52) U.S. Cl.
CPC .......... *G06F 11/3433* (2013.01); *G06F 9/466* (2013.01); *G06F 9/54* (2013.01); *G06F 11/006* (2013.01); *G06F 11/3051* (2013.01); *G06F 11/3423* (2013.01); *G06F 2201/87* (2013.01)

(58) Field of Classification Search
CPC .................................. G06F 9/54; G06F 9/466

USPC ........................................................ 719/310
See application file for complete search history.

(56) References Cited

U.S. PATENT DOCUMENTS 5,499,367 A * 3/1996 Bamford ............ G06F 11/1471
7,480,719 B2 1/2009 Inoue
(Continued)

FOREIGN PATENT DOCUMENTS

| JP | 2000-268012 | 9/2000 |
|---|---|---|
| JP | 2001-160040 | 6/2001 |

(Continued)

OTHER PUBLICATIONS

Jim Gray, Database and Transaction Processing Performance Handbook. (Year: 1993).*

(Continued)

*Primary Examiner* — Lechi Truong
(74) *Attorney, Agent, or Firm* — Martin & Ferraro, LLP

(57) ABSTRACT

According to an exemplary embodiment of the present disclosure, disclosed is a computer program stored in a computer readable storage medium. The computer program may include commands for making a computer perform operations, and the operations may include: receiving a message including a first transaction from an external computing device; reading the message and identifying the first transaction; recognizing a first transaction per second (TPS) value set in the first transaction; monitoring a current load value related to the first transaction; and determining whether to process the first transaction based on a result of a comparison between the current load value and the first TPS value.

9 Claims, 10 Drawing Sheets

(56) References Cited

U.S. PATENT DOCUMENTS

| | | | |
|---|---|---|---|
| 8,055,561 B1* | 11/2011 | Khan | G06Q 20/027 |
| | | | 705/1.1 |
| 2008/0098393 A1* | 4/2008 | Chai | G06Q 20/04 |
| | | | 718/101 |
| 2011/0047610 A1* | 2/2011 | Mylavarapu | H04L 63/0428 |
| | | | 726/12 |
| 2015/0248631 A1* | 9/2015 | Brown | G06Q 10/06316 |
| | | | 705/7.26 |
| 2015/0309884 A1* | 10/2015 | Campbell | G06F 11/1469 |
| | | | 714/19 |
| 2017/0371761 A1* | 12/2017 | Piga | G06F 11/3409 |
| 2018/0062937 A1* | 3/2018 | Narasimhan | H04L 43/0876 |

FOREIGN PATENT DOCUMENTS

| | | |
|---|---|---|
| JP | 5010314 | 6/2012 |
| KR | 1020130060916 | 6/2013 |

OTHER PUBLICATIONS

Office Action dated Sep. 26, 2019 from the Korean Intellectual Property Office (KIPO) for Application No. KR10-2018-0063164.

* cited by examiner

SERVER, METHOD OF CONTROLLING SERVER, AND COMPUTER PROGRAM STORED IN COMPUTER READABLE MEDIUM THEREFOR

CROSS-REFERENCE TO RELATED APPLICATIONS

This application claims priority to and the benefit of Korean Patent Application No. 10-2018-0063164 filed in the Korean Intellectual Property Office on Jun. 1, 2018, the entire contents of which are incorporated herein by reference.

TECHNICAL FIELD

The present disclosure relates to a program managing a server, and particularly, to a program, which manages a load of a transaction received by a server, and a server storing the same.

BACKGROUND ART

By a server according to the related art, when many transactions are processed, a time for processing the transactions may be increased. When the time for processing the transactions is increased as described above, performance of the server may be degraded.

In the meantime, recently, various generic technologies, which enable the server to execute an application in linkage with a display of a web page, are provided. Accordingly, research on a technology for constructing an information system by using a web function provided by a user interface continues.

In the meantime, as a technology of controlling a load of an information system, Korean Patent Application Laid-Open No. 2001-160040 discloses a technology of executing a server program in one computer and increasing multiplicity of the server program when a rate of use of a center processing unit (CPU) of the computer by the server program is high.

Korean Patent Application Laid-Open No. 2000-268012 discloses a technology, in which in a client server system including a load balancer connected to a local area network (LAN) and a server computer, when a load of the server computer exceeds an allocation value, the load balancer stops a reception of a transaction from a terminal.

SUMMARY OF THE INVENTION

The present disclosure is conceived in response to the foregoing background technology, and provides a computer program stored in a computer readable medium, which guarantees processing of an important transaction and improves stability of a system.

The technical objects of the present disclosure are not limited to the foregoing technical objects, and other non-mentioned technical objects will be clearly understood by those skilled in the art from the description below.

An exemplary embodiment of the present disclosure provides a computer program stored in a computer readable storage medium. The computer program may include commands for making a computer perform operations, and the operations may include: receiving a message including a first transaction from an external computing device; reading the message and identifying the first transaction; recognizing a first transaction per second (TPS) value set in the first transaction; monitoring a current load value related to the first transaction; and determining whether to process the first transaction based on a result of a comparison between the current load value and the first TPS value.

The determining whether to process the first transaction includes determining to process the first transaction when the current load value is smaller than the first TPS value.

The determining whether to process the first transaction may include recognizing that an error is generated in the first transaction when the current load value is equal to or larger than the first TPS value.

The method may further include performing an error transaction corresponding to the first transaction when it is recognized that the error is generated in the first transaction.

The error transaction may be a transaction transmitting an error message to the external computing device.

The performing of the error transaction may include: storing the first transaction in a memory and reading the first transaction from the memory and processing the read first transaction when a specific condition is satisfied.

The specific condition may be satisfied when a predetermined time elapses.

The specific condition may be satisfied when the current load value is smaller than a predetermined value.

The recognizing of the first TPS Value set in the first transaction may include recognizing the first TPS value set in the first transaction among TPS values, which are set in a plurality of transactions stored in a memory, respectively.

When the first transaction includes a first subordinate transaction and a second subordinate transaction, the first TPS value may be a value calculated by an addition of a second TPS value set in the first subordinate transaction and a third TPS value set in the second subordinate transaction.

Another exemplary embodiment of the present disclosure provides a server. The server may include: a transception module, which receives a message including a first transaction from an external computing device; a memory, which stores a transaction per second (TPS) value set in each of a plurality of transactions including the first transaction; a message determination module, which reads the message and identifies the first transaction; a TPS value recognition module, which recognizes a first TPS value set in the first transaction stored in the memory; a monitoring module, which monitors a current load value related to the first transaction; and a processor, which determines whether to process the first transaction based on a result of the comparison between the current load value and the first TPS value.

Still another exemplary embodiment of the present disclosure provides a method of controlling a server. The method may include: receiving a message including a first transaction from an external computing device; reading the message and identifying the first transaction; recognizing a first transaction per second (TPS) value set in the first transaction; monitoring a current load value related to the first transaction; and determining whether to process the first transaction based on a result of a comparison between the current load value and the first TPS value.

The technical solutions obtainable from the present disclosure are not limited to the foregoing solutions, and other non-mentioned solution means will be clearly understood by those skilled in the art from the description below.

The present disclosure provides the computer program stored in a computer readable medium controlling a server, thereby guaranteeing processing of an important transaction and improving stability of a system.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters are suggested in order to provide general understanding of one or more aspects. However, it is apparent that the aspect(s) may be carried out without the specific and detailed matters.

DETAILED DESCRIPTION

Figure 1:
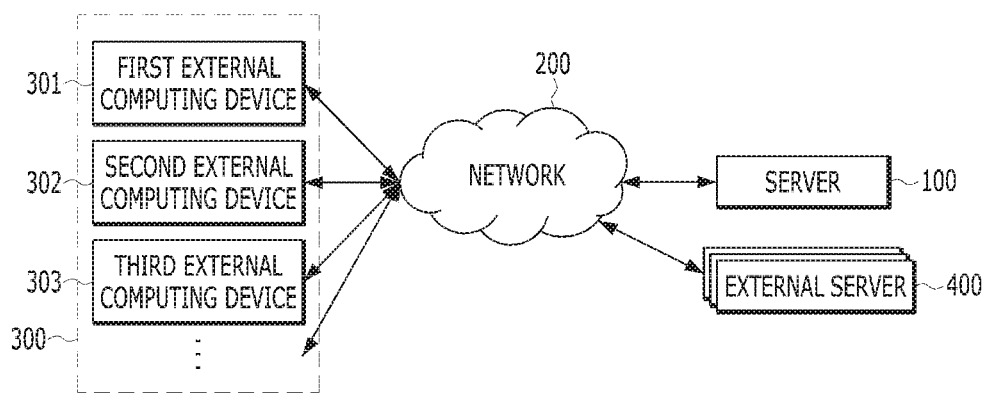
FIG. 1 is a schematic diagram of a server control system according to several exemplary embodiments of the present disclosure.

Various exemplary embodiments and/or aspects are now disclosed with reference to the drawings. In the description below, the plurality of particular detailed matters are disclosed for helping general understanding of one or more aspects for the purpose of description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include the aspects and the equivalents thereof.

An "exemplary embodiment", an "example", an "aspect", an "illustration", and the like used in the present specification may not be construed to be better or have an advantage compared to a predetermined described aspect, an aspect having a different design, or designs.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Terms "information" and "data" used in the present specification may be frequently used to be exchangeable with each other.

Hereinafter, the same or similar constituent element is denoted by the same reference numeral regardless of a reference numeral, and a repeated description thereof will be omitted. Further, in describing the exemplary embodiment disclosed in the present disclosure, when it is determined that detailed description relating to well-known functions or configurations may make the subject matter of the exemplary embodiment disclosed in the present disclosure unnecessarily ambiguous, the detailed description will be omitted. Further, the accompanying drawings are provided for helping to easily understand exemplary embodiments disclosed in the present specification, and the technical spirit disclosed in the present specification is not limited by the accompanying drawings.

Although "a first", "a second", and the like are used for describing various elements or constituent elements, but the elements or the constituent elements are not limited by the terms. The terms are used for discriminating one element or constituent element from another element or constituent element. Accordingly, a first element or constituent element mentioned below may also be a second element or constituent element within the technical spirit of the present disclosure as a matter of course.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined.

It should be understood that when one constituent element referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

Suffixes, "~ module" and "~ unit" for a constituent element used for the description below are given or mixed in consideration of only easiness of the writing of the specification, and the suffix itself does not have a discriminated meaning or role.

An object and an effect of the present disclosure, and technical configurations for achieving them will be apparent when the exemplary embodiments, which are described below in detail together with the accompanying drawing, are referred. In the description of the present disclosure, when a detailed description of a related publicly known function or configuration is determined to unnecessarily make the subject matter of the present disclosure unclear, the detailed description will be omitted. Further, terms described below are terms set in consideration of a function in the present disclosure, and may be changed according to an intension of a user and an operator or a usual practice.

However, the present disclosure is not limited to the exemplary embodiments disclosed below, and may be implemented in various different forms. However, the present exemplary embodiments are provided to make the present disclosure complete and to completely transfer the scope of the disclosure to those skilled in the art, and the present disclosure is simply defined by the claims. Accordingly, the definitions thereof should be made based on the entire contents of the present specification.

FIG. 1 is a schematic diagram of a server control system according to several exemplary embodiments of the present disclosure.

According to several exemplary embodiments of the present disclosure, the server control system may include at least one of a server 100, a network 200, an external computing device 300, and an external server 400. However, the constituent elements are not essential in implementing the server control system, so that the server control system may have the constituent elements more or less than the listed constituent elements.

In the several exemplary embodiments of the present disclosure, a "transaction" may mean a specific processed task, a specific transaction, and the like. For example, a transaction in a bank online system may be an account inquiry, remittance, and the like, and a transaction in an airline reservation system may be an airline ticket search, an airline ticket reservation, payment, and the like.

In the exemplary embodiments of the present disclosure, a transaction per second (TPS) value may be a numerical value indicating a transaction value processable per second. The value is a value set according to importance of a transaction by a manager of the server 100 when a program is set in the server 100. Herein, when importance of the transaction is high, a TPS value may be set with a high value, and when importance of the transaction is low, a TPS value may be set with a low value. For particular example, the case where a TPS value of a first transaction is 10 and a TPS value of a second transaction is 20 may mean that importance of the second transaction is higher than importance of the first transaction.

According to several exemplary embodiments of the present disclosure, the server 100 may process a transaction based on importance of the transaction. Accordingly, the server 100 may guarantee an important transaction to a user.

The server 100 may block processing of a transaction exceeding a TPS value, which the server 100 may handle. Accordingly, the server 100 may improve stability of the server 100.

According to the exemplary embodiments of the present disclosure, the server 100 may directly perform a transaction included in a received message. However, the present disclosure is not limited thereto, and the server 100 may transmit a transaction included in the received message to another external server 400 and make another external server 400 perform the transaction.

The server 100, the external computing device 300, and the external server 400 according to the exemplary embodiments of the present disclosure may transceive data for the system according to the exemplary embodiments of the present disclosure through the network 200.

According to several exemplary embodiments, the server 100 may receive a message including a transaction from the external computing device 300 through the network 200. Further, the server 100 may determine whether to process the received transaction based on a predetermined TPS value.

When the server 100 processes the transaction included in the message, the server 100 may transmit a response message to the external computing device 300. In the meantime, the server 100 does not process the transaction included in the message, the server 100 may transmit an error message to the external computing device 300.

According to several exemplary embodiments, the external computing device 300 may include a plurality of external computing devices. For example, the external computing device 300 may include a first external computing device 301, a second external computing device 302, a third external computing device 303, and the like.

The external computing device 300 may be a user terminal. Herein, the user terminal may be divided into a mobile/portable terminal and a stationary terminal according to portability. The mobile terminal may be divided into a handheld terminal and a vehicle mounted terminal according to whether a user can carry the mobile terminal himself/herself.

For example, the user terminal may include a mobile phone, a smart phone, a desktop computer, a personal computer, a notebook computer (laptop computer), a digital broadcasting terminal, a digital TV, digital signage, personal digital assistants (PDA), a portable multimedia player (PMP), a navigation device, a slate personal computer (PC), a tablet PC, an ultrabook, a wearable device, for example, a watch-type terminal (smart watch), a glass type terminal (smart glass), and a head mounted display (HMD), and the like.

According to several exemplary embodiments, the server 100 may be connected with the external server 400 through the network 200. Herein, the external server 400 may include a plurality of external servers.

The network 200 according to the exemplary embodiments of the present disclosure may use various wired communication systems, such as a public switched telephone network (PSTN), an x digital subscriber line (xDSL), a rate adaptive DSL (RADSL), a multi rate DSL (MDSL), a very high speed DSL (VDSL), a universal asymmetric DSL (UADSL), a high bit rate DSL (HDSL), and a local area network (LAN).

The network 200 presented herein may use various wireless communication systems, such as code division multi access (CDMA0, time division multi access (TDMA), frequency division multi access (FDMA), orthogonal frequency division multi access (OFDMA), single carrier-FDMA (SC-FDMA), and other systems.

The network 200 according to the exemplary embodiments of the present disclosure may be configured regardless of a communication aspect, such as a wired aspect and a wireless aspect, and may be configured by various communication networks, such as a personal area network (PAN) and a wide area network (WAN). Further, the network may be a publicly known world wide web (WWW), and may also use a wireless transmission technology used in short range communication, such as infrared data association (IrDA) or Bluetooth.

The technologies described in the present specification may also be used in other networks, as well as the foregoing networks.

Figure 2:
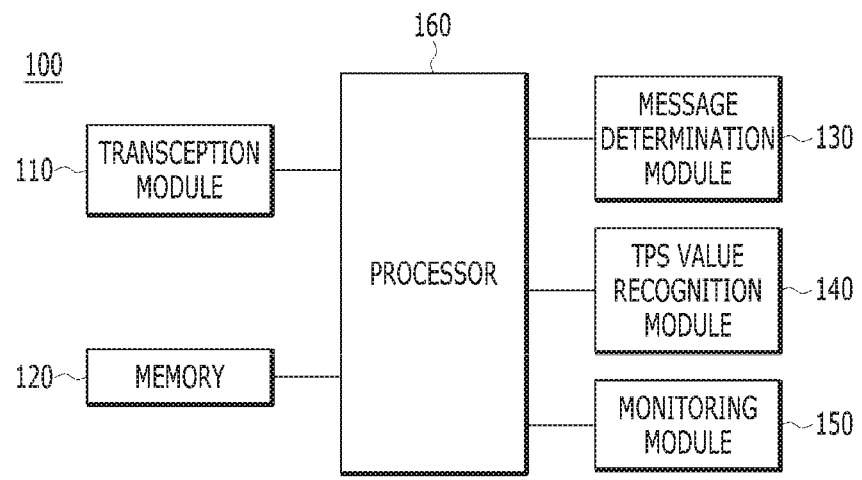
FIG. 2 is a block diagram of a server according to several exemplary embodiments of the present disclosure.

FIG. 2 is a block diagram of the server according to several exemplary embodiments of the present disclosure.

Referring to FIG. 2, the server 100 may include a transception module 110, a memory 120, a message determination module 130, a TPS value recognition module 140, a monitoring module 150, and a processor 160. However, the constituent elements are not essential for implementing the server 100, so that the server 100 may have the constituent elements more or less than the listed constituent elements. Herein, each of the constituent elements may be configured by a separate chip, module, or device, and may also be included in one device.

The transception module 110 may include one or more modules enabling communication between the server 100 and the communication system, the server 100 and the external computing device 300 or the server 100 and the external server 400. Further, the transception module 110 may include one or more modules connecting the server 100 to one or more networks.

The transception module 110 may include at least one of a mobile communication module, a wireless Internet module, and a short range communication module.

The transception module 110 may receive a message including a transaction from the external computing device 300.

The processor 160 may determine whether to process the transaction included in the message according to the reception of the message. When the processor 160 determines whether to process the transaction, the processor 160 may transmit at least one of a response message and an error message to the external computing device 300 by controlling the transception module 110.

The memory 120 stores data supporting various functions of the server 100. The memory 120 may store a plurality of application programs (or applications) driven in the server 100, and data and commands for an operation of the server 100.

At least some of the application programs may be downloaded from an external server through wired/wireless communication. Further, at least some of the application programs may exist in the server 100 from the time of the release for a basic function (for example, file management, a connection with another network through a main frame or a public network, and sharing of a device) of the server 100.

In the meantime, the application program may be stored in the memory 120 and installed in the server 100 to be driven to perform the operation (or the function) of the server 100 by the processor 160.

According to several exemplary embodiments of the present disclosure, the memory 120 may store a TPS value set in each of the plurality of transactions. Further, the memory 120 may store error messages corresponding to the plurality of errors.

Herein, the TPS value set in each of the plurality of transactions may be a value set and stored according to importance of the transaction when the manager sets a program (or updates a program) in the server 100. Accordingly, when the processor 160 receives the message including the transaction, the processor 160 may search for a TPS value corresponding to the transaction included in the message among the TPS values, which are set in the plurality of transactions stored in the memory 120, respectively. Further, the processor 160 may determine whether to process the transaction by using the searched TPS value. This will be described in detail with reference to FIG. 4.

As described above, the processor 160 may process the transaction based on the importance of the transaction. Accordingly, the processor 160 may guarantee an important transaction to the user. Further, the processor 160 may block processing of a transaction exceeding a TPS value, which the server 100 may handle. Accordingly, the processor 160 may improve stability of the server 100.

In the meantime, the error message corresponding to the plurality of errors may be mapped to each of the plurality of transactions and stored in the memory 120. Particularly, the error message may be a message set and stored by the manager so as to be mapped to each of the plurality of transactions when the manager sets the program (or updates the program) in the server 100. Accordingly, when the processor 160 recognizes that it is impossible to process the first transaction, the processor 160 may search for a first error message mapped to the first transaction in the memory 120 and transmit the searched first error message to the external computing device 300. Further, when the processor 160 recognizes that it is impossible to process the second transaction different from the first transaction, the processor 160 may search for a second error message mapped to the second transaction in the memory 120 and transmit the searched second error message to the external computing device 300. When the manager maps the same error message to the first transaction and the second transaction and sets the program, the first error message and the second error message may be the same. However, when the manager maps different error messages to the first transaction and the second transaction, respectively, and sets the program, the first error message may be different from the second error message.

The message determination module 130 may read the message received from the external computing device 300. Further, the message determination module 130 may identify a transaction included in a message.

According to the several exemplary embodiments of the present disclosure, when the message includes the plurality of transactions, the message determination module 130 may identify each of the plurality of transactions. When the message includes a plurality of subordinate transactions, the message determination module 130 may identify each of the plurality of subordinate transactions. Further, when the message includes the plurality of subordinate transactions, the message determination module 130 does not identify each of the plurality of subordinate transactions, but may also identify only an upper transaction for each of the plurality of subordinate transactions.

The TPS value recognition module 140 may be controlled to recognize the TPS value set in the transaction included in the message received from the external computing device 300.

Particularly, when the TPS value recognition module 140 receives the message from the external computing device 300, the TPS value recognition module 140 may search for the TPS value of the first transaction included in the received message in the memory 120 and recognize the searched TPS value. Herein, the memory 120 may store the TPS values set in all of the transactions.

For example, in the case where the TPS value of the first transaction is set by 100 and is stored in the memory 120, when the TPS value recognition module 140 receives the message including the first transaction, the TPS value recognition module 140 may recognize that the TPS value of the first transaction is 100.

The monitoring module 150 may monitor a current load value related to the first transaction included in the message. Herein, the current load value may be a value indicating a load of the first transaction processed by the server 100.

For example, when the first transaction is a transaction related to an airline reservation, the monitoring module 150 may recognize the amount of currently processed transactions related to the airline reservation when receiving the first transaction. When the monitoring module 150 receives the message including the first transaction in the state where 100 first transactions related to the airline reservation have been processed, the monitoring module 150 may recognize that a current load value related to the first transaction is 100.

The processor 160 generally controls a general operation of the server 100, in addition to the operation related to the server control. The processor 160 may process the signal, data, information, and the like input or output through the constituent elements or drive the application program stored in the memory 120, thereby providing or processing the appropriate information or function to the user.

In order to drive the application program stored in the memory, the processor 160 may control at least some of the constituent elements described with reference to FIG. 2. Further, the processor 160 may combine at least two or more of constituent elements among the constituent elements included in the server 100 and operate the application program for the driving of the application program.

At least some of the constituent elements may cooperate with one another and be operated for implementing the operation, the control, or the control method of the server 100 according to various exemplary embodiments described below. Further, the operation, the control, or the control method of the server 100 may be implemented in the server 100 by the driving of at least one application program stored in the memory 120.

Figure 3:
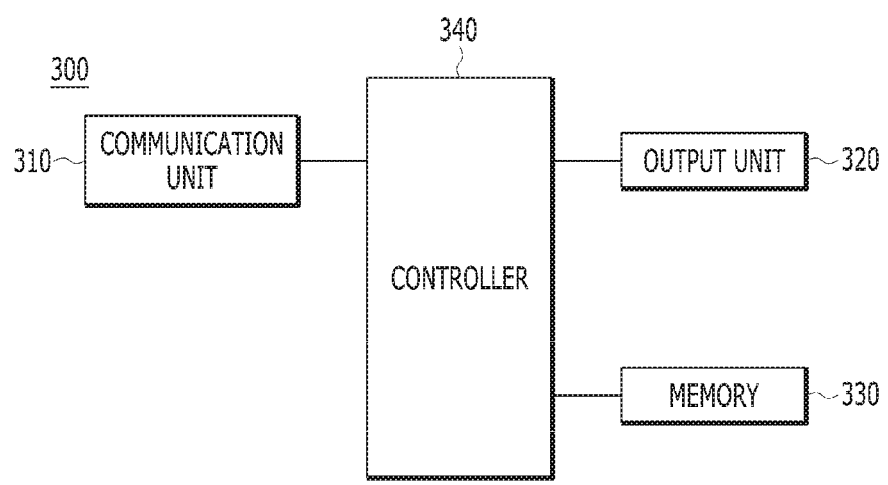
FIG. 3 is a block diagram of an external computing device according to several exemplary embodiments of the present disclosure.

FIG. 3 is a block diagram of the external computing device according to several exemplary embodiments of the present disclosure.

The external computing device 300 may include a communication unit 310, an output unit 320, a memory 330, and the like. However, the constituent elements illustrated in FIG. 3 are not essential in implementing the external computing device 300, so that the external computing device 300 described in the present specification may have the constituent elements more or less than the listed constituent elements.

More particularly, the communication unit 310 among the constituent elements may include one or more modules enabling communication between the external computing device 300 and the network 200, the external computing device 300 and the server 100, or the external computing device 300 and the external server 400. Further, the communication unit 310 may include one or more modules connecting the external computing device 300 to one or more networks.

The output unit 320 generates an output related to a visual sense, an auditory sense, or a tactile sense, and may include at least one of a display unit and a sound output unit. The display unit may provide an output interface between the external computing device 300 and the user.

For example, when the display unit receives the error message from the server 100, the display unit may output an error full text included in the received error message. Further, when the display unit receives a response message from the server 100, the display unit may output an image corresponding to a response message.

The memory 330 stores data supporting various functions of the external computing device 300. The memory 330 may store a plurality of application programs (or applications) driven in the external computing device 300, and data and commands for the operation of the external computing device 300. At least some of the application programs may be downloaded from an external server through wired/wireless communication. Further, at least some of the application programs may exist in the external computing device 300 from the time of the release for a basic function of the external computing device 300. In the meantime, the application program may be stored in the memory 330 and installed in the external computing device 300 to be driven to perform the operation (or the function) of the external computing device 300 by a controller 340.

The controller 340 generally controls the general operation of the external computing device 300 in addition to the operation related to the application program. The controller 340 may process the signal, data, information, and the like input or output through the constituent elements or drive the application program stored in the memory 330, thereby providing or processing the appropriate information or function to the user.

In order to drive the application program stored in the memory 330, the controller 340 may control at least some of the constituent elements described with reference to FIG. 3. Further, the controller 340 may combine at least two or more of constituent elements among the constituent elements included in the external computing device 300 and operate the application program for the driving of the application program.

At least some of the constituent elements may cooperate with one another and be operated for implementing the operation, the control, or the control method of the external computing device 300 according to various exemplary embodiments described below. Further, the operation, the control, or the control method of the external computing device 300 may be implemented in the external computing device 300 by the driving of at least one application program stored in the memory 330.

Figure 4:
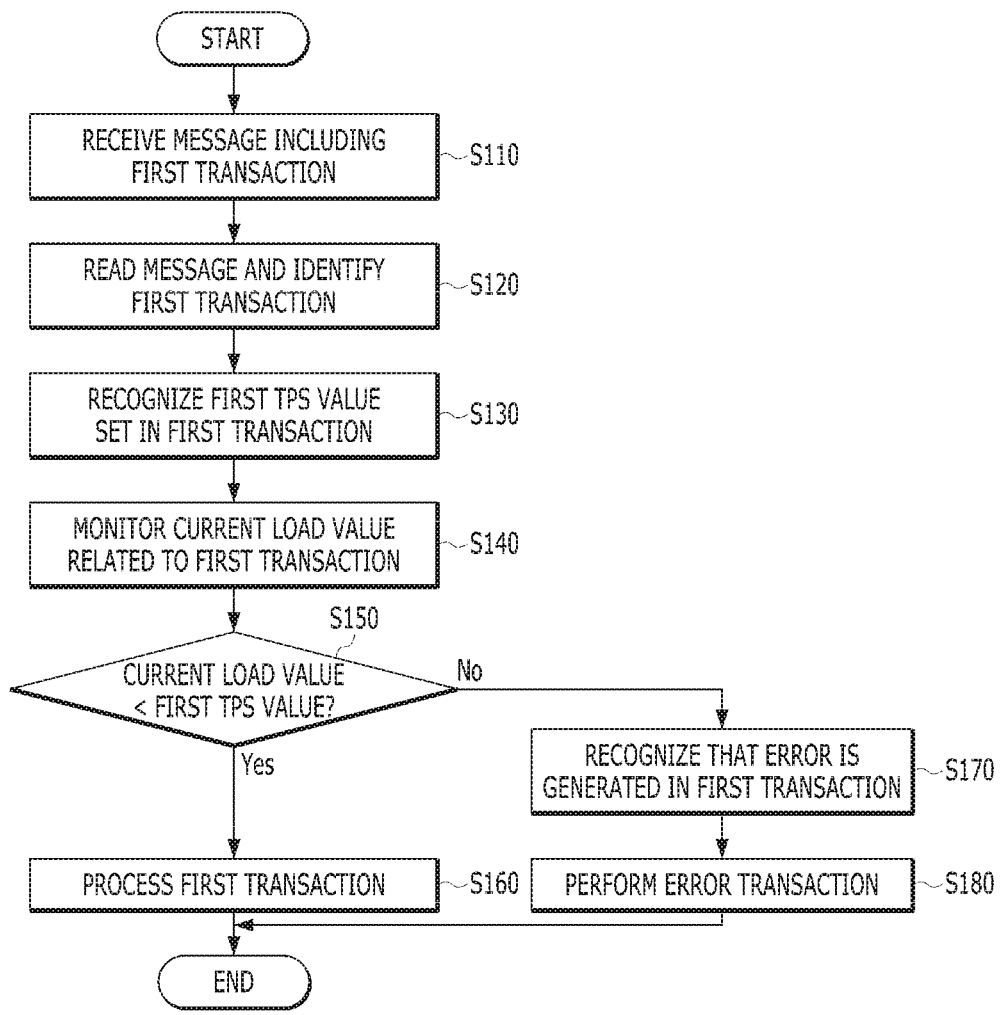
FIG. 4 is a flowchart for describing a method of processing a transaction by a server according to several exemplary embodiments of the present disclosure.

FIG. 4 is a flowchart for describing a method of processing a transaction by the server according to several exemplary embodiments of the present disclosure.

According to several exemplary embodiments of the present disclosure, the processor 160 may receive a message including the first transaction through the transception module 110 (S110). Herein, the message may be a sort of signal including the first transaction. However, the present disclosure is not limited thereto, and the message may also include a plurality of transactions.

The processor 160 may read a message and control the message determination module 130 so as to identify the first transaction (S120). Particularly, when the processor 160 receives the message, the processor 160 may control the message determination module 130 so as to extract the first transaction included in the message and then identify the first transaction.

In the meantime, according to several exemplary embodiments, the first transaction may also include the plurality of subordinate transactions. When the processor 160 receives the message including the first transaction including the plurality of subordinate transactions, the processor 160 may identify each of the plurality of subordinate transactions through the message determination module 130. Further, the processor 160 may process each of the plurality of subordinate transactions. This will be described in detail with reference to FIG. 6.

When the processor 160 identifies the first transaction included in the message through the message determination module 130, the processor 160 may recognize the first TPS value set in the first transaction (S130). Herein, the first TPS value set in the first transaction may be stored in the memory 120 in advance.

For example, in the case where the first transaction is the transaction related to an airline reservation, when the message determination module 130 receives the first transaction, the message determination module 130 may search for a TPS value (for example, 50) set in the transaction related to the airline reservation in the memory 120 and recognize the searched TPS value as the TPS value of the first transaction.

Particularly, the TPS value for each of the plurality of transactions may be stored in the memory 120. The processor 160 may identify the transaction included in the message through the message determination module 130 when receiving the message, and search for a TPS value set for the identified transaction in the memory 120. The processor 160 may recognize the searched TPS value as the TPS value of the identified transaction.

In the meantime, as described above, the first transaction may also include the plurality of subordinate transactions. In this case, the processor 160 may recognize the TPS value set in each of the plurality of subordinate transactions. This will be described in detail with reference to FIG. 5.

The monitoring module 150 may monitor a current load value related to the first transaction (S140). Further, the processor 160 may compare the monitored current load value with the first TPS value.

For example, when the first transaction is the transaction related to an airline reservation, the monitoring module 150 may recognize the amount of currently processed transactions related to the airline reservation when receiving the first transaction. When the monitoring module 150 receives the message including the first transaction in the state where 100 first transactions related to the airline reservation have been processed, the monitoring module 150 may recognize that a current load value related to the first transaction is 100.

For another example, when the monitoring module 150 receives the message including the first transaction in the state where 20 first transactions related to the airline reservation have been processed, the monitoring module 150 may recognize the current load value related to the first transaction as 20.

When the current load value is less than the first TPS value (S150, Yes), the processor 160 may process the first transaction (S160).

For example, when the monitoring module 150 recognizes that the first TPS value of the first transaction is 50 and the current load value of the first transaction is 20, the processor 160 may process the first transaction.

In the meantime, when the current load value is equal to or larger than the first TPS value (S150, No), the processor 160 may recognize that an error is generated in the first transaction (S170).

For example, when the monitoring module 150 recognizes that the first TPS value of the first transaction is 50 and the current load value of the first transaction is 100, the processor 160 may recognize that an error is generated in the first transaction.

When the processor 160 recognizes that the error is generated in the first transaction in operation S170, the processor 160 may perform an error transaction corresponding to the first transaction (S180).

According to several exemplary embodiments, the error transaction may be differently mapped according to the kind of transaction included in the message and stored in the memory 120. For example, when it is recognized that an error is generated in an airline ticket search transaction, the memory 120 may store the search for an airline ticket again when a predetermined time elapses as an error transaction. Further, when it is recognized that an error is generated in an airline ticket payment transaction, the memory 120 may store the transmission of an error message to the external computing device requesting the airline ticket payment transaction as an error transaction.

As described above, when the error transaction is differently mapped according to the kind of transaction and is stored in the memory 120, the processor 160 may search for the error transaction corresponding to the first transaction in the memory 120 when it is recognized that the error is generated in the first transaction, and perform the searched error transaction.

Examples of performing the error transaction by the processor 160 will be described in detail with reference to FIGS. 7 to 9.

Figure 5:
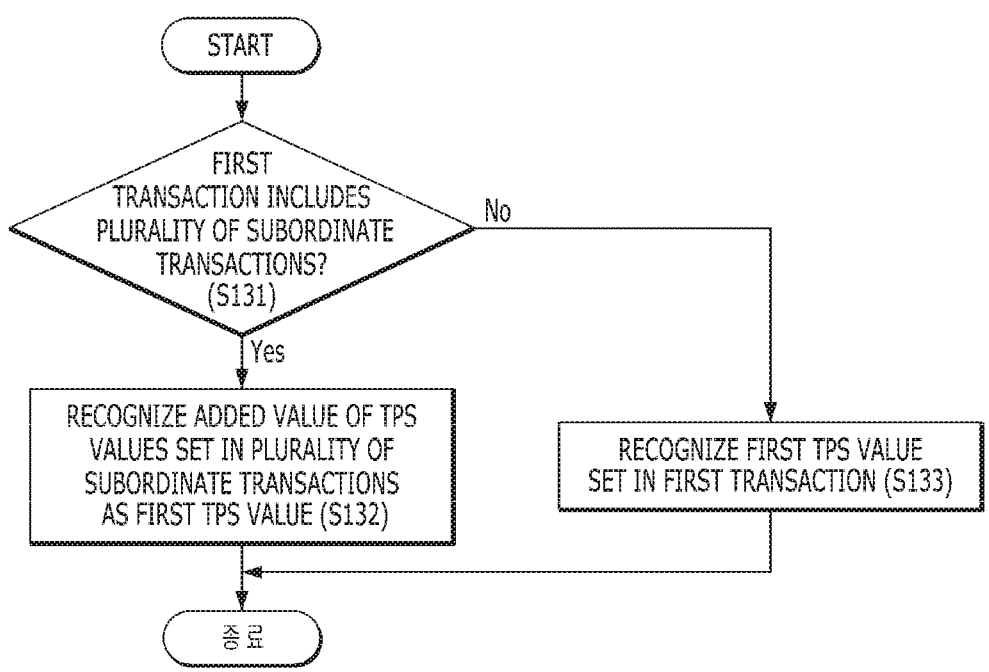
FIG. 5 is a flowchart for describing a method of recognizing a first TPS value according to several exemplary embodiments of the present disclosure.

FIG. 5 is a flowchart for describing a method of recognizing the first TPS value according to several exemplary embodiments of the present disclosure.

According to several exemplary embodiments of the present disclosure, the transaction included in the message may include the plurality of transactions. Accordingly, when the processor 160 may recognize the first TPS value set in the first transaction (S130 of FIG. 4), the processor 160 may determine whether the first transaction includes the plurality of subordinate transactions (S131).

When it is recognized that the first transaction does not include the plurality of subordinate transactions (S131, No), the processor 160 may recognize the first TPS value set in the first transaction (S133). In this case, the processor 160 may compare the current load value with the TPS value set in the first transaction and determine whether to process the first transaction.

In the meantime, when it is recognized that the first transaction includes the plurality of subordinate transactions (S131,Yes), the processor 160 may recognize the TPS value set in each of the plurality of subordinate transactions included in the first transaction. Particularly, the processor 160 may recognize an added value of the TPS values set in the plurality of subordinate transactions as the first TPS value (S132).

According to several exemplary embodiments, the first transaction may include a first subordinate transaction and a second subordinate transaction. When the first transaction is a transaction related to an airline reservation, the first transaction may include a first subordinate transaction for airline ticket inquiry and a second subordinate transaction for airline ticket payment. In the meantime, the TPS value (for example, 10) may be set in the first subordinate transaction for the airline ticket inquiry. Further, the TPS value (for example, 20) may be set in the second subordinate transaction for the airline ticket payment.

Accordingly, the processor 160 may add 10 that is the TPS value set in the first subordinate transaction for the airline ticket inquiry and 20 that is the TPS value set in the second subordinate transaction for the airline ticket payment and recognize 30 as the first TPS value set in the first transaction.

In the meantime, when the processor 160 recognizes the TPS value set in the first transaction by adding the TPS value set in the first subordinate transaction and the TPS value set in the second subordinate transaction, the processor 160 may process the transaction through a procedure described below.

Referring back to FIG. 4, the monitoring module 150 may monitor a current load value related to the first transaction (S140). Further, the processor 160 may compare the monitored current load value with the first TPS value (S150).

When the current load value is less than an added value of the first TPS values set in the first subordinate transaction and the second subordinate transaction included in the first transaction (S150, Yes), the processor 160 may process the first transaction (S160).

For example, when the processor 160 recognizes that the first TPS value set in the first transaction is 30 and recognizes that the current load value of the first transaction is 25, the processor 160 may process the first transaction.

In the meantime, when the current load value is equal to or larger than the added value of the first TPS values set in the first subordinate transaction and the second subordinate transaction included in the first transaction (S150, No), the processor 160 may recognize that an error is generated in the first transaction (S170).

For example, when the processor 160 recognizes that the first TPS value set in the first transaction is 25 and recognizes that the current load value of the first transaction is 30, the processor 160 may recognize that an error is generated in the first transaction.

When the processor 160 recognizes that the error is generated in the first transaction in operation S170, the processor 160 may perform an error transaction corresponding to the first transaction (S180).

Examples of performing the error transaction by the processor 160 will be described in detail with reference to FIGS. 7 to 9.

Figure 6:
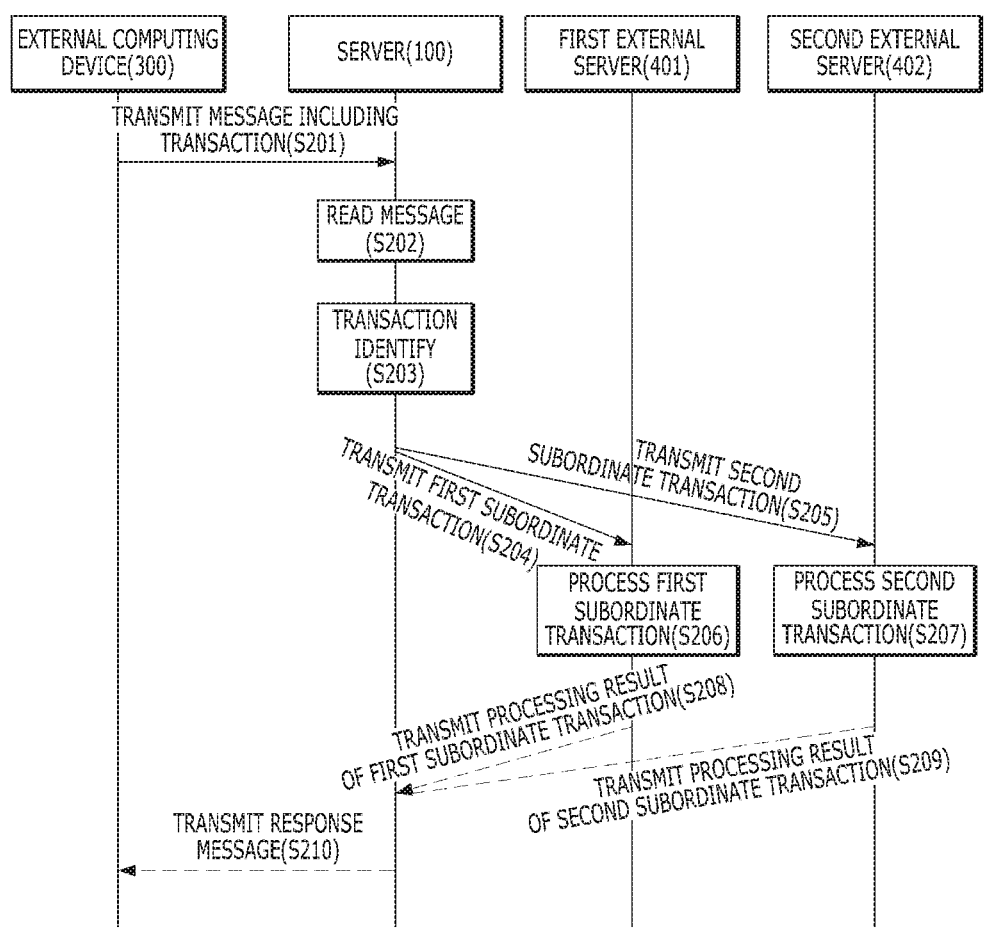
FIG. 6 is a flowchart for describing a method of processing, by the server, a transaction in linkage with an external server according to several exemplary embodiments of the present disclosure.

FIG. 6 is a flowchart for describing a method of processing, by the server, a transaction in linkage with an external server according to several exemplary embodiments of the present disclosure.

According to several exemplary embodiments, the server 100 may receive a message including a transaction from the external computing device 300 (S201). In this case, the server 100 may read the received message (S202). Further, the server 100 may identify a transaction included in the message (S203).

When the transaction includes a first subordinate transaction and a second subordinate transaction, the server 100 may transmit the first subordinate transaction to a first external server 401. At the same time, the server 100 may transmit the second subordinate transaction to a second external server 402 (S205).

For example, the external computing device 300 may be a computing device of a travel agency customer. Further, the server 100 may be a travel agency server, and the first subordinate transaction may be a transaction related to a hole reservation. Further, the second subordinate transaction may be a transaction related to an airline ticket reservation. In the meantime, the first external server 401 may be an external server, which manages the hotel reservation. Further, the second external server 402 may be an external server, which manages the airline ticket reservation.

Particularly, the computing device of the user may transmit a message including a transaction related to a reservation of a travel product to the travel agency server. In this case, the travel agency server may read the received message, and recognize that a subordinate transaction related to the hotel reservation and a subordinate transaction related to the airline ticket reservation are included in the transaction related to the reservation of the travel product. Further, when the travel agency server recognizes that it is possible to process the transaction related to the reservation of the travel product based on a processing possibility of the transaction related to the reservation of the travel product, the travel agency server may transmit the subordinate transaction related to the hotel reservation to the first external server, which manages the hotel reservation, and transmit the subordinate transaction related to the airline ticket reservation to the second external server, which manages the airline ticket reservation.

According to several exemplary embodiments, the first external server 401 and the second external server 402 receive the first subordinate transaction and the second subordinate transaction, respectively, thereby processing the first subordinate transaction and the second subordinate transaction, respectively (S206 and S207).

Accordingly, the server 100 may receive a processing result of the first subordinate transaction from the first external server 401 (S208). Further, the server 100 may receive a processing result of the second subordinate transaction from the second external server 402 (S209).

In describing subsequent to the foregoing example, the first external server, which manages the hotel reservation, may complete the processing of the hotel reservation of the travel agency customer and transmit a processing result to the travel agency server. Further, the second external server, which manages the airline ticket reservation, may complete the processing of the airline ticket reservation of the travel agency customer and transmit a processing result to the travel agency server. In this case, the travel agency server receiving the processing results may transmit a message for the processing result to the computing device of the travel agency customer.

An order of operation S208 and S209 may be changed. That is, the server 100 may first receive the processing result of the second subordinate transaction from the second external server 402, and then receive the processing result of the first subordinate transaction from the first external server 401 according to the processing order of the external server 400. In the meantime, the operations S208 and S209 may also be simultaneously performed.

When the server 100 receives the processing result of the first subordinate transaction and the processing result of the second subordinate transaction server 100 may transmit a response message to the external computing device 300 (S210).

In the meantime, when the server 100 receives at least one of the processing result of the first subordinate transaction and the processing result of the second subordinate transaction, the server 100 may also transmit the response message to the external computing device 300 based on the received processing result (S210).

That is, when the server 100 first receives the processing result of the first subordinate transaction, the server 100 may transmit the response message for the processing result of the first subordinate transaction to the external computing device 300. However, the present disclosure is not limited thereto, when the server 100 receives both the processing result of the first subordinate transaction and the processing result of the second subordinate transaction, the server 100 may also transmit the response message for the processing results of the transactions to the external computing device 300 (S210).

Figure 7:
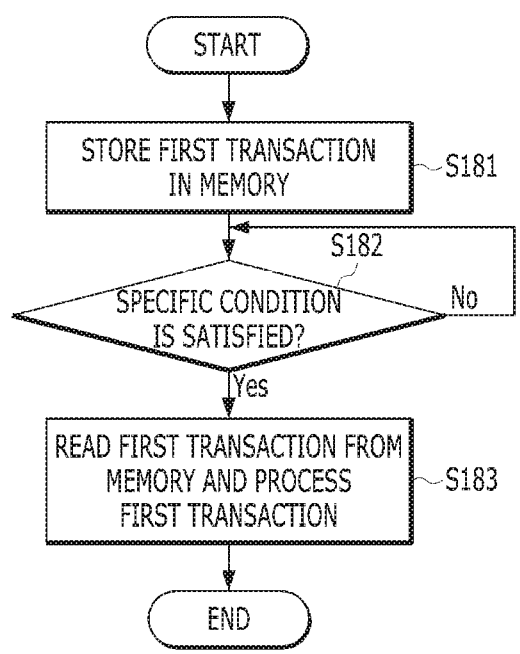
FIG. 7 is a flowchart for describing a method of performing, by a server, an error transaction according to several exemplary embodiments of the present disclosure.

FIG. 7 is a flowchart for describing a method of performing, by the server, the error transaction according to several exemplary embodiments of the present disclosure.

Referring to FIG. 4, when the current load value is equal to or larger than the first TPS value, the processor 160 may recognize that an error is generated in the first transaction (S170). Further, the processor 160 may perform the error transaction (S180). Hereinafter, a particular exemplary embodiment of the method of performing the error transaction by the processor 160 will be described.

Referring to FIG. 7, the processor 160 may store the first transaction, in which it is recognized that the error is generated, in the memory (S181). For example, the processor 160 receives the first transaction for the airline ticket reservation, but when the processor 160 recognizes that an error is generated because of the high current load value related to the first transaction, the processor 160 may store the first transaction in the memory 120.

According to several exemplary embodiments, the memory 120 may store the TPS value set in each of the plurality of transactions. Further, the memory 120 may store error messages corresponding to the plurality of errors. In addition, the memory 120 may also include a space storing the transaction, in which the error is generated.

The processor 160 may recognize whether a specific condition is satisfied (S182).

Herein, the specific condition may be a condition, under which the error transaction may be processed by the server 100.

According to several exemplary embodiments, the specific condition may be satisfied when a predetermined time elapses. For example, the processor 160 may recognize that the specific condition is satisfied when a predetermined time, 5 seconds, elapse.

According to several exemplary embodiments, the specific condition may be satisfied when the load value of the server 100 is smaller than a predetermined value. For example, when the predetermined load value is less than 100 and the current load value of the server 100 is less than 100, which is the predetermined load value, the processor 160 may recognize that the specific condition is satisfied.

When the processor 160 does not recognize that the specific condition is satisfied (S182, No), the processor 160 may check whether the specific condition is satisfied at a predetermined time interval. For example, the processor 160 may check whether the specific condition is satisfied at an interval of 5 seconds.

In the meantime, when the processor 160 recognizes that the specific condition is satisfied (S182, Yes), the processor 160 may read the first transaction stored in the memory from the memory. Further, the processor 160 may process the read first transaction.

For example, the processor 160 may read and process the first transaction stored in the memory when the predetermined time, 5 seconds, elapse.

For another example, when the current load value of the server 100 is decreased to 70, which is smaller than the predetermined load value (for example, 100), the processor 160 may read and process the first transaction stored in the memory.

As a result, the error transaction performed by the processor 160 may include an operation of monitoring, by the processor 160, whether the specific condition for processing the error is satisfied and processing the transaction recognized to have the error when the specific condition is satisfied, and an operation of transmitting a response message for the processing of the transaction recognized to have the error to the external computing device 300 by the processor 160.

Figure 8:
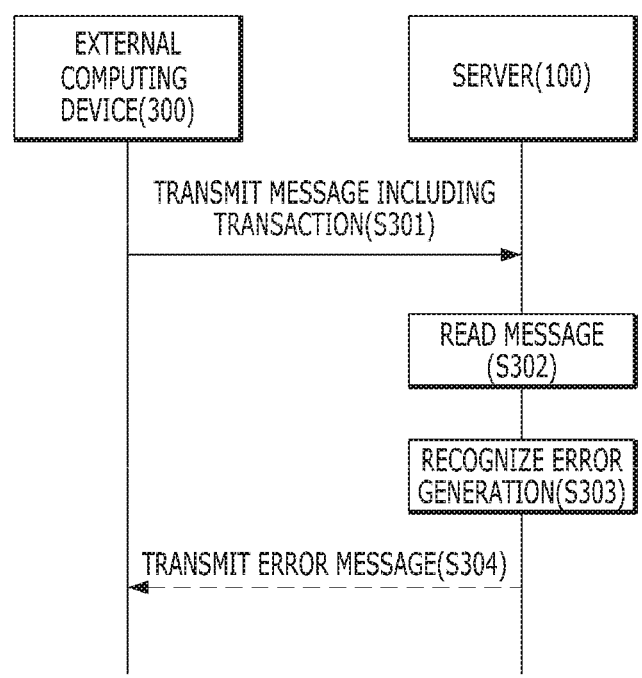
FIG. 8 is a flowchart for describing an example of a method of performing, by the server, an error transaction according to several exemplary embodiments of the present disclosure.

FIG. 8 is a flowchart for describing an example of a method of performing, by the server, an error transaction according to several exemplary embodiments of the present disclosure. In relation to FIG. 8, contents overlapping the contents described with reference to FIGS. 1 to 7 will not be described again, and a difference will be mainly described below.

First, referring to FIG. 4, when the current load value is equal to or larger than the first TPS value, the processor 160 may recognize that an error is generated in the first transaction (S170). Further, the processor 160 may perform the error transaction (S180). Hereinafter, another particular exemplary embodiment of the method of performing the error transaction by the processor 160 will be described.

Referring to FIG. 8, the processor 160 may receive a message including a transaction from the external computing device 300 (S301). The processor 160 may read the received message (S302). Further, the processor 160 may recognize that an error is generated in the transaction included in the read message (S303). In this case, the processor 160 may transmit an error message to the external computing device 300 (S304). For example, the error message may include text, such as "try again in a few seconds" and "processing is impossible due to the large amount of current loads".

As described above, the error message may be mapped to each of the plurality of transactions and be stored in the memory 120. Particularly, the error message may be a message set and stored by the manager so as to be mapped to each of the plurality of transactions when the manager sets the program (or updates the program) in the server 100.

As a result, the error transaction performed by the processor 160 may include an operation of searching for the error message mapped to the transaction in the memory 120 when the processor 160 recognizes that it is impossible to process the transaction, and then transmitting the searched error message to the external computing device 300.

In the meantime, according to the several exemplary embodiments, the controller 340 of the external computing device 300 may output text included in the error message to the output unit 320 when receiving the error message.

Figure 9:
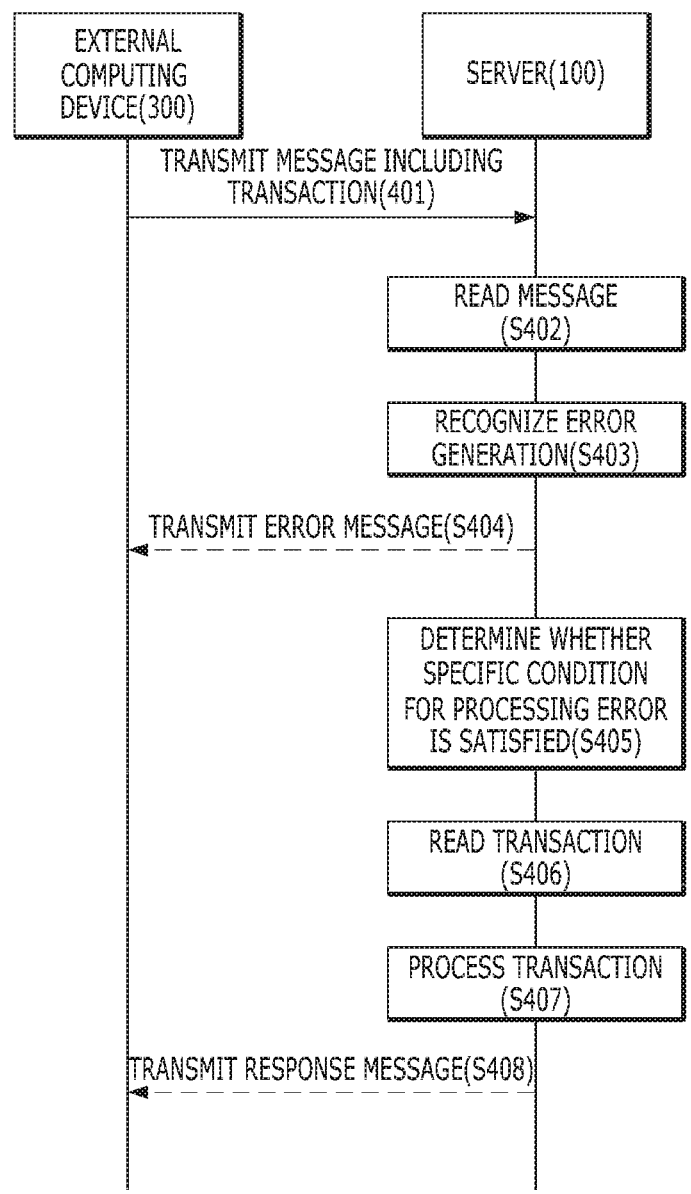
FIG. 9 is a flowchart for describing another example of a method of performing, by the server, an error transaction according to several exemplary embodiments of the present disclosure.

FIG. 9 is a flowchart for describing another example of a method of performing, by the server, an error transaction according to several exemplary embodiments of the present disclosure. In relation to FIG. 9, contents overlapping the contents described with reference to FIGS. 1 to 7 will not be described again, and a difference will be mainly described below.

First, referring to FIG. 4, when the current load value is equal to or larger than the first TPS value, the processor 160 may recognize that an error is generated in the first transaction (S170). Further, the processor 160 may perform the error transaction (S180). Hereinafter, another particular exemplary embodiment of the method of performing the error transaction by the processor 160 will be described.

Referring to FIG. 9, the processor 160 may receive a message including a transaction from the external computing device 300 (S401). The processor 160 may read the received message (S402). Further, the processor 160 may recognize that an error is generated in the transaction included in the read message (S403). In this case, the processor 160 may transmit an error message to the external computing device 300 (S404). For example, the error message may include text, such as "wait for a while" and "retrying".

As described above, the error message may be mapped to each of the plurality of transactions and be stored in the memory 120. Particularly, the error message may be a message set and stored by the manager so as to be mapped to each of the plurality of transactions when the manager sets the program (or updates the program) in the server 100.

In the meantime, according to several exemplary embodiments, the controller 340 of the external computing device 300 may output the text included in the error message to the output unit 320 when the error message is received.

The processor 160 may recognize whether a specific condition for processing the error is satisfied (S405). Herein, the specific condition may be a condition, under which the error transaction may be processed by the server 100.

According to several exemplary embodiments, the specific condition may be satisfied when a predetermined time elapses. For example, the processor 160 may recognize that the specific condition is satisfied when a predetermined time, 5 seconds, elapse.

According to several exemplary embodiments, the specific condition may be satisfied when the load value of the server 100 is smaller than a predetermined value. For example, when the predetermined load value is less than 100 and the current load value of the server 100 is less than 100, which is the predetermined load value, the processor 160 may recognize that the specific condition is satisfied.

In the meantime, when the processor 160 does not recognize that the specific condition is satisfied, the processor 160 may check whether the specific condition is satisfied at a predetermined time interval. For example, the processor 160 may check whether the specific condition is satisfied at an interval of 5 seconds.

When the processor 160 recognizes that the specific condition is satisfied, the processor 160 may read the transaction stored in the memory 120 from the memory (S406). Further, the processor 160 may process the read transaction (S407).

For example, the processor 160 may read and process the transaction stored in the memory 120 when the predetermined time, 5 seconds, elapse. For another example, when the current load value of the server 100 is decreased to 70, which is smaller than the predetermined load value (for example, 100), the processor 160 may read and process the transaction stored in the memory 120.

When the transaction, which is recognized to have the error, is completely processed, the processor 160 may transmit a response message indicating the completion of the processing of the transaction to the external computing device 300 (S408).

As a result, the error transaction performed by the processor 160 may include an operation of generating, by the processor 160, an error message and transmitting the generated error message to the external computing device 300, and an operation of monitoring, by the processor 160, whether the specific condition for processing the error is satisfied and processing the transaction, which is recognized to have the error when the specific condition is satisfied, and an operation of transmitting, by the processor 160 a response message for the processing of the transaction, which is recognized to have the error, to the external computing device 300.

Figure 10:
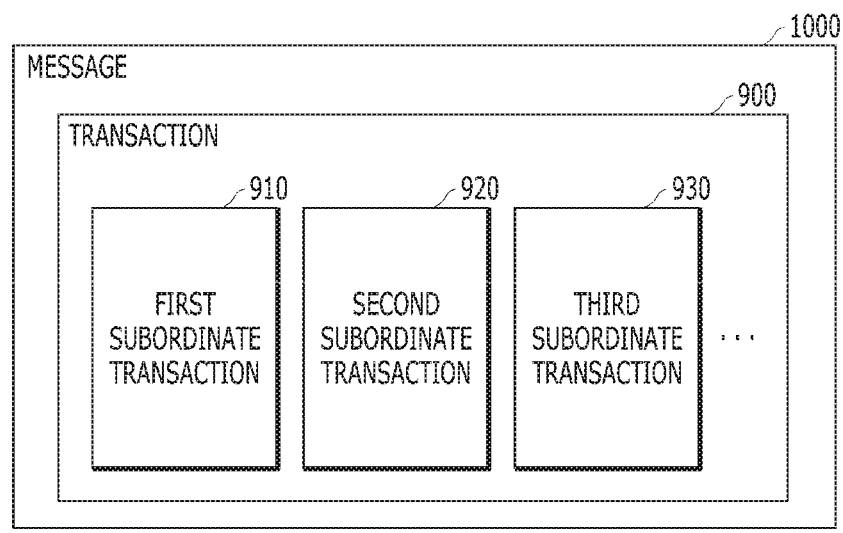
FIG. 10 is a diagram for describing a message including a transaction according to several exemplary embodiments of the present disclosure.

FIG. 10 is a diagram for describing a message including a transaction according to several exemplary embodiments of the present disclosure.

According to several exemplary embodiments of the present disclosure, a message 1000 may include a transaction 900. Further, the transaction 900 may include a plurality of subordinate transactions 910, 920, 930, . . . .

However, the present disclosure is not limited thereto, and the message may also include only one transaction. Herein, the message 1000 may be a sort of signal including the transaction.

The "transaction" may mean a specific processed task, a specific transaction, and the like. For example, a transaction in a bank online system may be an account inquiry, remittance, and the like, and a transaction in an airline reservation system may be airline ticket search, an airline ticket reservation, payment, and the like.

For example, when the server 100 is a travel agency server, the message 1000 may include the transaction 900 related to a travel product contract. In this case, a first subordinate transaction may be a transaction related to a hotel reservation. Further, a second subordinate transaction may be a transaction related to an airline ticket reservation. Further, a third subordinate transaction may be a transaction related to a cost payment.

For another example, when the server 100 is a bank server, the message 1000 may include the transaction 900 related to a bank business. Particularly, for example, in the transaction 900 related to a transfer to a plurality of accounts by a user among the bank businesses, a first subordinate transaction may be a transaction related to a transfer of a specific amount of money from an account of the user to a first account. Further, a second subordinate transaction may be a transaction related to a transfer of a specific amount of money from the account of the user to a second account. For another example, a first subordinate transaction may be a transaction related to a transfer of money from the account of the user to an account of bank A. Further, a second subordinate transaction may be a transaction related to a transfer of money from the account of the user to an account of bank B.

According to another exemplary embodiment of the present disclosure, the transaction 900 included in the message may not include the subordinate transaction.

For example, when the server 100 is a server related to a hotel reservation, a first message may include only a transaction related to the hotel reservation.

For another example, when the server 100 is a server related to an airline ticket reservation, a first message may include only a transaction related to the airline ticket reservation.

For another example, when the server 100 is a server related to a travel expense payment, a first message may include only a transaction related to the travel expense payment.

As described above, the transaction included in the message may be processed based on a hierarchical structure or may also be processed based on a single structure according to a setting value received from the manager terminal or a service provided by the server 100.

Figure 11:
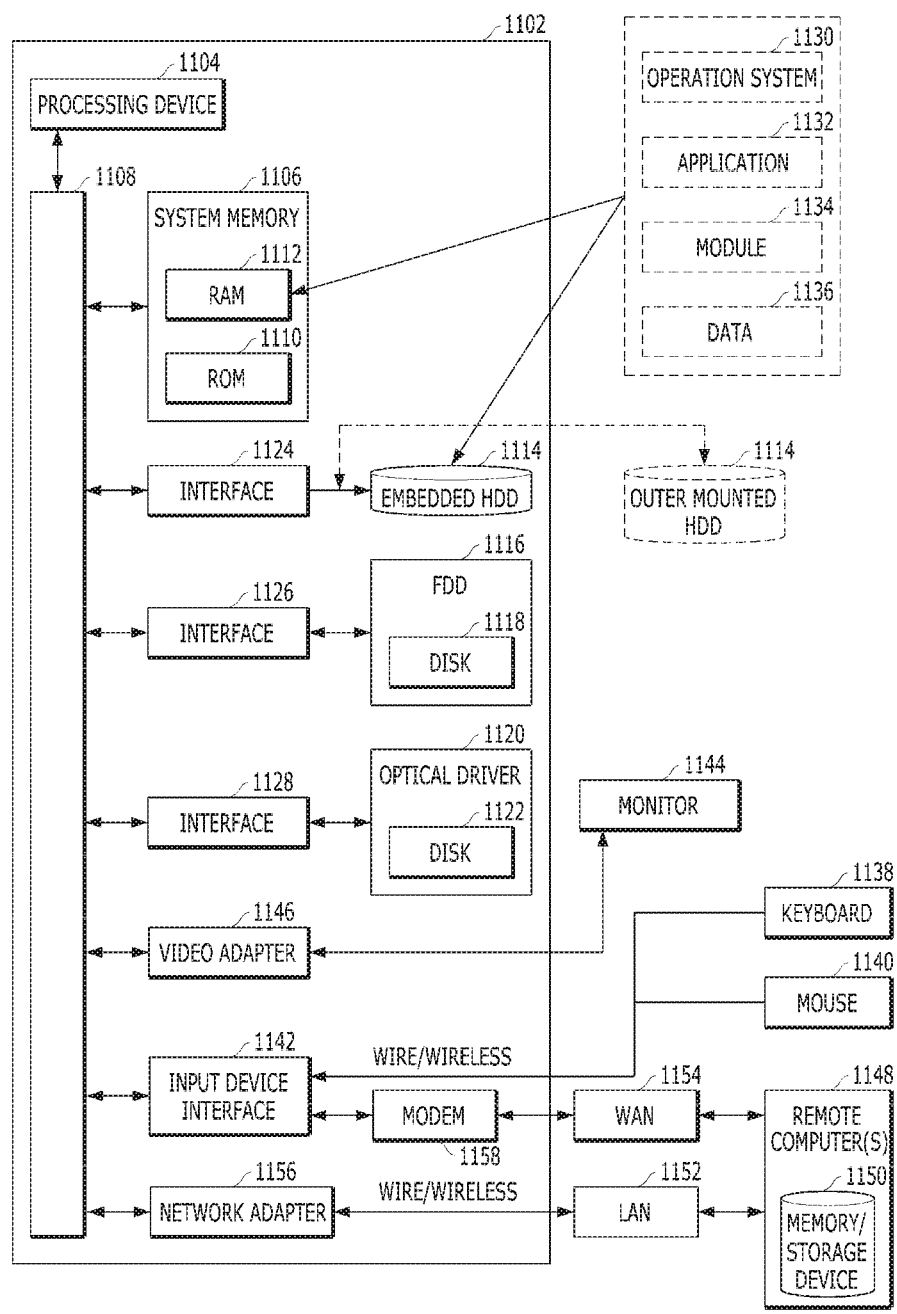
FIG. 11 is a simple and general schematic diagram of an illustrative computing environment, in which the exemplary embodiments of the contents of the present disclosure may be implemented.

FIG. 11 is a simple and general schematic diagram of an illustrative computing environment, in which the exemplary embodiments of the contents of the present disclosure may be implemented.

The present disclosure has been generally described in relation to a computer executable command executable in one or more computers, but those skilled in the art will appreciate well that the present disclosure is combined with other program modules and/or be implemented by a combination of hardware and software.

In general, a module in the present specification includes a routine, a procedure, a program, a component, a data structure, and the like performing specific task or a specific abstract data form. Further, those skilled in the art will appreciate well that the method of the present disclosure may be carried out by a single-processor or a multi-processor computer system, a mini computer, a main computer, a personal computer, a hand-held computing device, a microprocessor-based or programmable home appliance, and the like (each of which may be connected with one or more relevant devices and operated), and other computer system configurations.

The exemplary embodiments of the present disclosure may be carried out in a distribution computing environment, in which certain tasks are performed by remote processing devices connected through a communication network. In the distribution computing environment, a program module may be positioned in both a local memory/storage device and a remote memory device.

The computer generally includes various computer readable medium. A computer accessible medium may be a computer readable medium regardless of the kind of medium, and the computer readable medium includes volatile and non-volatile media, transitory and non-non-transitory media, portable and non-portable media. As a not-limited example, the computer readable medium may include a computer readable storage medium and a computer readable transport medium.

The computer readable storage medium includes volatile and non-volatile media, transitory and non-non-transitory media, portable and non-portable media constructed by a predetermined method or technology, which stores information, such as a computer readable command, a data structure, a program module, or other data. The computer readable storage medium includes a random access memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transmission medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not illustrated) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of compute readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display device are also connected to the system bus 1108 through an interface, such as a video adapter 1146. In addition to the monitor 1144, the computer generally includes other peripheral output devices (not illustrated), such as a speaker and a printer.

The computer 1102 may be operated in a network environment by using a logical connection to one or more remote computers, such as remote computer(s) 1148, through wired and/or wireless communication. The remote computer(s) 1148 may be a work station, a server computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 may include a wireless access point installed therein for the communication with the wireless adapter 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the network environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer readable storage medium including instructions that when executed by a processor perform a process, the process comprising:

receiving a message including a first transaction from an external computing device;

reading the message and identifying the first transaction;

recognizing a first transaction per second (TPS) value set in the first transaction among TPS values which are set in a plurality of transactions respectively, wherein the first transaction per second (TPS) value is set according to importance of the first transaction;

monitoring a current load value related to the first transaction;

determining whether to process the first transaction based on a result of a comparison between the current load value and the first TPS value, the determining whether to process the first transaction includes recognizing that an error is generated in the first transaction when the current load value is equal to or larger than the first TPS value; and performing an error transaction corresponding to the first transaction when it is recognized that the error is generated in the first transaction.

2. The non-transitory computer readable storage medium of claim 1, wherein the determining whether to process the first transaction includes determining to process the first transaction when the current load value is smaller than the first TPS value.

3. The non-transitory computer readable storage medium of claim 1, wherein the error transaction is a transaction transmitting an error message to the external computing device.

4. The non-transitory computer readable storage medium of claim 1, wherein the performing of the error transaction includes:

storing the first transaction in a memory; and reading the first transaction from the memory and processing the read first transaction when a specific condition is satisfied.

5. The non-transitory computer readable storage medium of claim 4, wherein the specific condition is satisfied when a predetermined time elapses.

6. The non-transitory computer readable storage medium of claim 4, wherein the specific condition is satisfied when the current load value is smaller than a predetermined value.

7. The non-transitory computer readable storage medium of claim 1, wherein when the first transaction includes a first subordinate transaction and a second subordinate transaction, the first TPS value is a value calculated by an addition of a second TPS value set in the first subordinate transaction and a third TPS value set in the second subordinate transaction.

8. A server, comprising:

a transception module, which receives a message including a first transaction from an external computing device;

a memory, which stores a transaction per second (TPS) value set in each of a plurality of transactions including the first transaction, wherein the transaction per second (TPS) value is set according to importance of each of the plurality of transactions;

a message determination module, which reads the message and identifies the first transaction;

a TPS value recognition module, which recognizes a first TPS value set in the first transaction stored in the memory among TPS values which are set in a plurality of transactions respectively, wherein the first transaction per second (TPS) value is set according to importance of the first transaction;

a monitoring module, which monitors a current load value related to the first transaction; and a processor, which determines whether to process the first transaction based on a result of the comparison between the current load value and the first TPS value, the determining whether to process the first transaction includes recognizing that an error is generated in the first transaction when the current load value is equal to or larger than the first TPS value, the processor performing an error transaction corresponding to the first transaction when it is recognized that the error is generated in the first transaction.

9. A method of controlling a server, the method comprising:

receiving a message including a first transaction from an external computing device;

reading the message and identifying the first transaction;

recognizing a first transaction per second (TPS) value set in the first transaction among TPS values which are set in a plurality of transactions respectively, wherein the first transaction per second (TPS) value is set according to importance of the first transaction;

monitoring a current load value related to the first transaction;

determining whether to process the first transaction based on a result of a comparison between the current load value and the first TPS value, the determining whether to process the first transaction includes recognizing that an error is generated in the first transaction when the current load value is equal to or larger than the first TPS value; and performing an error transaction corresponding to the first transaction when it is recognized that the error is generated in the first transaction.

* * * * *